US009263737B2

(12) United States Patent
Han et al.

(10) Patent No.: US 9,263,737 B2
(45) Date of Patent: *Feb. 16, 2016

(54) LITHIUM SECONDARY BATTERY OF HIGH POWER PROPERTY WITH IMPROVED HIGH POWER DENSITY

(71) Applicant: LG Chem, Ltd., Seoul (KR)

(72) Inventors: KyungHee Han, Gyeonggi-do (KR); Chang Joo Han, Daejeon (KR); Su-min Park, Daejeon (KR); JiEun Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/087,572

(22) Filed: Nov. 22, 2013

(65) Prior Publication Data

US 2014/0080000 A1    Mar. 20, 2014

Related U.S. Application Data

(63) Continuation of application No. PCT/KR2012/003950, filed on May 18, 2012.

(30) Foreign Application Priority Data

May 23, 2011  (KR) .......................... 10-2011-0048544

(51) Int. Cl.
| | |
|---|---|
| *H01M 4/36* | (2006.01) |
| *H01M 4/525* | (2010.01) |
| *H01M 10/0525* | (2010.01) |
| *H01M 4/505* | (2010.01) |
| *H01M 4/131* | (2010.01) |
| *H01M 4/587* | (2010.01) |
| *H01M 4/02* | (2006.01) |
| *H01M 2/16* | (2006.01) |
| *H01M 4/485* | (2010.01) |

(52) U.S. Cl.
CPC .............. *H01M 4/364* (2013.01); *H01M 4/131* (2013.01); *H01M 4/505* (2013.01); *H01M 4/525* (2013.01); *H01M 4/587* (2013.01); *H01M 10/0525* (2013.01); *H01M 2/166* (2013.01); *H01M 4/485* (2013.01); *H01M 2004/021* (2013.01); *H01M 2220/20* (2013.01); *Y02E 60/122* (2013.01); *Y02T 10/7011* (2013.01)

(58) Field of Classification Search
CPC .................... H01M 4/131; H01M 4/36–4/364; H01M 4/60–4/525; H01M 10/05–10/0525; H01M 2220/20
See application file for complete search history.

(56) References Cited

U.S. PATENT DOCUMENTS

| | | | |
|---|---|---|---|
| 6,083,150 A | 7/2000 | Aznoian et al. | |
| 6,087,044 A | 7/2000 | Iwase et al. | |
| 6,482,547 B1 * | 11/2002 | Yoon et al. | ................. 429/231.8 |
| 6,803,150 B1 | 10/2004 | Iriyama et al. | |
| 7,625,670 B2 | 12/2009 | Lee et al. | |
| 7,659,037 B2 | 2/2010 | Fukunaga et al. | |
| 2001/0016289 A1 | 8/2001 | Oura et al. | |
| 2002/0047112 A1 | 4/2002 | Hosoya et al. | |
| 2004/0038116 A1 | 2/2004 | Baurens et al. | |
| 2006/0035151 A1 | 2/2006 | Kumeuchi et al. | |
| 2006/0127771 A1 | 6/2006 | Yamaki et al. | |
| 2006/0134523 A1 | 6/2006 | Moriguchi et al. | |
| 2006/0234127 A1 | 10/2006 | Kim et al. | |
| 2006/0286459 A1 | 12/2006 | Zhao et al. | |
| 2007/0072086 A1 | 3/2007 | Nakagawa | |
| 2007/0111098 A1 * | 5/2007 | Yang Kook et al. | ...... 429/231.95 |
| 2007/0134558 A1 * | 6/2007 | Fukunaga et al. | ............ 429/329 |
| 2008/0193841 A1 | 8/2008 | Sun et al. | |
| 2009/0035659 A1 | 2/2009 | Takeuchi et al. | |
| 2009/0239146 A1 | 9/2009 | Nakagawa et al. | |
| 2010/0003401 A1 | 1/2010 | Horpel et al. | |
| 2010/0012886 A1 | 1/2010 | Ryu et al. | |
| 2010/0209757 A1 | 8/2010 | Ooyama et al. | |
| 2011/0053003 A1 | 3/2011 | Deguchi | |
| 2011/0059351 A1 | 3/2011 | Kohno et al. | |
| 2011/0111280 A1 | 5/2011 | Tamakoshi et al. | |
| 2012/0009452 A1 | 1/2012 | Ueda | |
| 2012/0141875 A1 | 6/2012 | Watanabe | |
| 2012/0231340 A1 | 9/2012 | Imanari | |
| 2014/0080000 A1 | 3/2014 | Han et al. | |

(Continued)

FOREIGN PATENT DOCUMENTS

| | | |
|---|---|---|
| CN | 1237003 A | 12/1999 |
| CN | 1795573 A | 6/2006 |

(Continued)

OTHER PUBLICATIONS

Machine translation for Seon et al, KR 2009-078128 A.*
Machine translation for Toshiro et al., JP 2011054371 A.*
Machine translation for Koga et al., JP 2010-137996 A.*
International Search Report for Application No. PCT/KR2012/005473 dated Jan. 28, 2013.
International Search Report for Application No. PCT/KR2012/003938 dated Nov. 14, 2012.
International Search Report for Application No. PCT/KR2012/003945 dated Nov. 21, 2012.
International Search Report for Application No. PCT/KR2012/003942 dated Nov. 21, 2012.
International Search Report for Application No. PCT/KR2012/003950 dated Nov. 21, 2012.
International Search Report for Application No. PCT/KR2012/003954 dated Nov. 22, 2012.

(Continued)

*Primary Examiner* — Edu E Enin-Okut
(74) *Attorney, Agent, or Firm* — Lerner, David, Littenberg, Krumholz & Mentlik, LLP

(57) ABSTRACT

Disclosed is a high-output lithium secondary battery including: a cathode that includes, as cathode active materials, a first cathode active material represented by Formula 1 below and having a layered structure and a second cathode active material represented by Formula 2 below and having a spinel structure, wherein the amount of the second cathode active material is between 40 and 100 wt % based on the total weight of the cathode active materials; an anode including crystalline graphite and amorphous carbon as anode active materials, wherein the amount of the amorphous carbon is between 40 and 100 wt % based on the total weight of the anode active materials; and a separator.

16 Claims, 1 Drawing Sheet

(56) References Cited

U.S. PATENT DOCUMENTS

| | | | |
|---|---|---|---|
| 2014/0080001 A1 | 3/2014 | Han et al. |
| 2014/0080002 A1 | 3/2014 | Han et al. |
| 2014/0099551 A1 | 4/2014 | Han et al. |
| 2014/0113198 A1 | 4/2014 | Han et al. |
| 2014/0120425 A1 | 5/2014 | Han et al. |
| 2014/0127583 A1 | 5/2014 | Han et al. |

FOREIGN PATENT DOCUMENTS

| | | | | |
|---|---|---|---|---|
| CN | 1886847 | A | 12/2006 | |
| CN | 101807715 | A | 8/2010 | |
| EP | 1180809 | A2 | 2/2002 | |
| EP | 1265302 | A2 | 12/2002 | |
| FR | 2845823 | A1 | 4/2004 | |
| JP | 6-60880 | | 3/1994 | |
| JP | 08-227714 | | 9/1996 | |
| JP | 10-012217 | | 1/1998 | |
| JP | 10-083818 | | 3/1998 | |
| JP | 10-112318 | | 4/1998 | |
| JP | 10-241690 | | 9/1998 | |
| JP | 11-031501 | A | 2/1999 | |
| JP | 11-354122 | | 12/1999 | |
| JP | 2000-012030 | A | 1/2000 | |
| JP | 2001-229926 | A | 8/2001 | |
| JP | 2001-243943 | A | 9/2001 | |
| JP | 2002-117836 | A | 4/2002 | |
| JP | 2002-270247 | A | 9/2002 | |
| JP | 2002279987 | A | 9/2002 | |
| JP | 2003-036846 | A | 2/2003 | |
| JP | 2003-092108 | A | 3/2003 | |
| JP | 2003-282139 | A | 10/2003 | |
| JP | 2003-282145 | A | 10/2003 | |
| JP | 2004-006094 | A | 1/2004 | |
| JP | 2004-134245 | A | 4/2004 | |
| JP | 2004-259511 | | 9/2004 | |
| JP | 2005-259617 | A | 9/2005 | |
| JP | 2005-285462 | A | 10/2005 | |
| JP | 2005-294011 | A | 10/2005 | |
| JP | 2005285633 | A | 10/2005 | |
| JP | 2006-032070 | A | 2/2006 | |
| JP | 2006-236830 | A | 9/2006 | |
| JP | 2006-278322 | A | 10/2006 | |
| JP | 2006-310181 | A | 11/2006 | |
| JP | 2007-165111 | A | 6/2007 | |
| JP | 2007-179765 | A | 7/2007 | |
| JP | 2007-207626 | A | 8/2007 | |
| JP | 2007-335360 | A | 12/2007 | |
| JP | 2008262768 | A | 10/2008 | |
| JP | 2009-032682 | A | 2/2009 | |
| JP | 2009-176448 | A | 8/2009 | |
| JP | 2010-050079 | A | 3/2010 | |
| JP | 2010-092845 | A | 4/2010 | |
| JP | 2010137996 | A * | 6/2010 | ............. C01G 45/00 |
| JP | 2011-054371 | | 3/2011 | |
| JP | 2011054371 | A * | 3/2011 | ........ H01M 10/0525 |
| JP | 2011-076997 | A | 4/2011 | |
| JP | 2011-081960 | A | 4/2011 | |
| JP | 2011126771 | A | 6/2011 | |
| KR | 2003-0021112 | A | 3/2003 | |
| KR | 2004-0007356 | A | 1/2004 | |
| KR | 20040098420 | A | 11/2004 | |
| KR | 2005-0004930 | A | 1/2005 | |
| KR | 1020070021041 | A | 2/2007 | |
| KR | 10-0801637 | B1 | 2/2008 | |
| KR | 20080056226 | A | 6/2008 | |
| KR | 2009-0078128 | A | 7/2009 | |
| KR | 2009078128 | A * | 7/2009 | ............. H01M 4/58 |
| KR | 2010-0129471 | A | 12/2010 | |
| WO | 2007-021086 | A1 | 2/2007 | |
| WO | WO 2007139333 | A1 * | 12/2007 | ............. H01M 4/58 |

OTHER PUBLICATIONS

International Search Report for Application No. PCT/KR2012/003958 dated Nov. 21, 2012.

Kang et al., "Investigations on the modified natural graphite as anode materials in lithium ion battery." Journal of Physics and Chemistry of Solids 60 (2008) 1265-1271.

Shi, H., Structural and Lithium Intercalation Properties of Synthetic and Natural Graphite, Nov. 1996, J. Electrochem. Soc., 143, 3466-3472.

Translation of KR 2009078128A.

Kosova et al., "Mechanochemical synthesis of LiMn2O4 cathode material for lithium batteries." Solid State Ionics 135 (2000) pp. 107-114.

Office Action from Chinese Aplication No. 201280023966.6, dated May 6, 2015.

Office Action from Chinese Application No. 201280024526.2, dated May 6, 2015.

Numata, Tatsuji et al. "Advantages of Blended Ectrode for Lithium-Ion Rechargeable Batteries," NEC Res. & Develop, vol. 41, No. 1, Jan. 2000, pp. 8-11.

Whittingham, "Lithium Batteries and Cathode Materials", Cemical Reviews, vol. 104, No. 10, 2004, pp. 4271-4301.

"Mechanochemical synthesis of LiMn2O4 cathode material for lithium batteries," Solid State Ionics 135 (2000) 107-114 to Kosova et al.

* cited by examiner

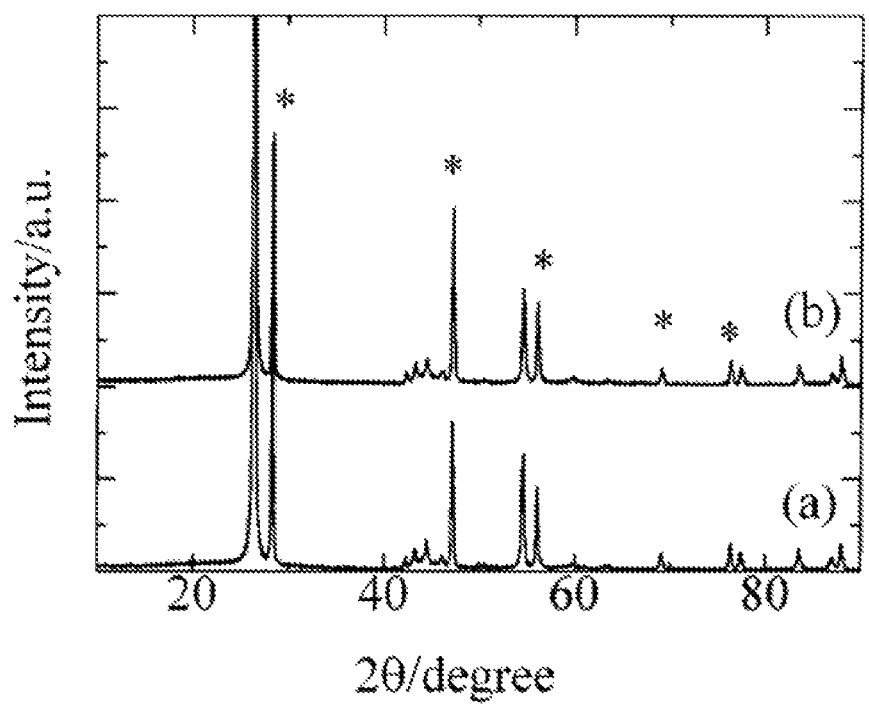

LITHIUM SECONDARY BATTERY OF HIGH POWER PROPERTY WITH IMPROVED HIGH POWER DENSITY

CROSS-REFERENCE TO RELATED APPLICATION

The present application is a continuation of International Application No. PCT/KR2012/003950, filed May. 18, 2012, which claims the benefit of Korean Patent Application No. 10-2011-0048544, filed May 23, 2011, the disclosures of which are Incorporated herein by reference.

TECHNICAL FIELD

The present invention relates to a high-output lithium secondary battery having enhanced power density characteristics. More specifically, the present invention relates to a high-output lithium secondary battery including: a cathode that includes, as cathode active materials, a first cathode active material represented by Formula 1 below and having a layered structure and a second cathode active material represented by Formula 2 below and having a spinel structure, wherein the amount of the second cathode active material is between 40 and 100 wt % based on the total weight of the cathode active materials; an anode including crystalline graphite and amorphous carbon as anode active materials, wherein the amount of the amorphous carbon is between 40 and 100 wt % based on the total weight of the anode active materials; and a separator.

BACKGROUND ART

As mobile device technology continues to develop and demand therefor continues to increase, demand for secondary batteries as energy sources is rapidly increasing. In addition, secondary batteries have recently been used as power sources for electric vehicles (EVs), hybrid electric vehicles (HEVs), and the like. Accordingly, research into secondary batteries that can meet a variety of demands is underway and, in particular, demand for lithium secondary batteries having high energy density, high discharge voltage and high output stability is increasing.

In particular, lithium secondary batteries used as power sources of EVs and HEVs require high-output characteristics that exhibit high output within a short period of time.

Conventionally, a lithium cobalt composite oxide having a layered structure is generally used as a cathode active material of a lithium secondary battery. When such lithium cobalt composite oxide is used as a cathode active material, however, cobalt as a main component is very expensive and output characteristics thereof are poor. Thus, lithium secondary batteries including such cathode active material are not suitable for use in HEVs requiring high output because HEVs demand high output power from the batteries, particularly when starting from a standstill, rapidly accelerating, and the like.

Meanwhile, graphite is mainly used as an anode active material, which has a very low discharge potential of about −3 V with respect to a standard hydrogen electrode potential, and exhibits very reversible charge/discharge behavior due to uniaxial orientation of a graphene layer and thus has excellent cycle lifespan.

However, such graphite has poor output properties and thus a secondary battery including such anode active material is not suitable for use as an energy source for HEVs requiring high output. Thus, research into amorphous carbon used as an anode active material is underway, but conventional amorphous carbon has an energy density of less than 300 mAh/g.

DISCLOSURE

Technical Problem

The present invention aims to address the aforementioned problems of the related art and to achieve technical goals that have long been sought.

Thus, an object of the present invention is to provide a lithium secondary battery exhibiting the same energy density characteristics as those of a lithium secondary battery using conventional amorphous carbon and enhanced high-output characteristics and low-temperature characteristics that are well suited to EVs and HEVs.

TECHNICAL SOLUTION

In accordance with one aspect of the present invention, provided is a high-output lithium secondary battery including:

a cathode including, as cathode active materials, a first cathode active material represented by Formula 1 below and having a layered structure and a second cathode active material represented by Formula 2 below and having a spinel structure, in which the amount of the second cathode active material is between 40 and 100 wt % based on the total weight of the cathode active materials;

an anode including crystalline graphite and amorphous carbon as anode active materials, in which the amount of the amorphous carbon is between 40 and 100 wt % based on the total weight of the anode active materials; and a separator.

$$Li_x(Ni_vMn_wCo_yM_z)O_{2-t}A_t \quad (1)$$

In Formula 1,
$0.8 < x \leq 1.3$, $0 \leq v \leq 0.9$, $0 \leq w \leq 0.9$, $0 \leq y \leq 0.9$, $0 \leq z \leq 0.9$, $x+v+w+y+z=2$, and $0 \leq t < 0.2$;

M refers to at least one metal or transition metal cation having an oxidation number of +2 to +4; and A is a monovalent or divalent anion.

$$Li_aMn_{2-b}M'_bO_{4-c}A'_c \quad (2)$$

In Formula 2, $0.8 < a \leq 1.3$, $0 \leq b \leq 0.5$, and $0 \leq c \leq 0.3$; M' refers to at least one metal or transition metal cation having an oxidation number of +2 to +4; and A' is a monovalent or divalent anion.

The crystalline graphite may be one selected from the group consisting of a first graphite having a specific surface area (with respect to capacity) of 0.007 to 0.011 and a second graphite having a specific surface area (with respect to capacity) of 0.005 to 0.013 or a mixture thereof. When the first graphite and the second graphite are used in combination, a mixing ratio of the first graphite to the second graphite may be in the range of 1:9 to 9:1.

In particular, the first graphite may be surface-modified graphite having a powder conductivity of 100 S/cm or greater to less than 1000 S/cm at a powder density of 1.4 to 1.6 g/cc and has 3R and 2H peaks distinguishable as a rhombohedral peak of a (101) plane at 2θ=43° based on XRD data.

In addition, the second graphite has a powder conductivity of 10 S/cm or greater to less than 200 S/cm at a powder density of 1.4 to 1.6 g/cc and has a 2H peak as the rhombohedral peak of the (101) plane at 2θ=43° based on XRD data. The second graphite has the same powder conductivity as that of amorphous carbon and thus provides enhanced output characteristics to the lithium secondary battery. In addition, the second graphite has a similar internal structure to that of amorphous carbon, thus greatly extending battery lifespan.

The amorphous carbon may be one selected from the group consisting of a first carbon having a specific surface area (with respect to capacity) of 0.01 to 0.031 and a second carbon having a specific surface area (with respect to capacity) of 0.0035 to 0.0170 or a mixture thereof. When the first carbon and the second carbon are used in combination, a weight ratio of the first carbon to the second carbon may be in the range of 1:9 to 9:1.

In particular, the first carbon has a powder conductivity of 15 S/cm or greater to less than 100 S/cm at a powder density of 1.0 to 1.2 g/cc, and the second carbon has a powder conductivity of 30 S/cm or greater to less than 100 S/cm at a powder density of 1.4 to 1.6 g/cc.

The amounts of the first cathode active material having a layered structure of Formula 1 and the second cathode active material having a spinel structure of Formula 2 may be in the range of 10 wt % to 50 wt % and in the range of 50 wt % to 90 wt %, respectively, based on the total weight of the first and second cathode active materials.

In a specific embodiment of the present invention, the first cathode active material may be a layered crystalline structure lithium transition metal oxide having an average particle diameter (with respect to capacity) of 0.03 to 0.1 µm/mAh and a powder conductivity of $1 \times 10^{-3}$ S/cm or greater to less than $10 \times 10^{-3}$ S/cm at a powder density of 2.65 to 2.85 g/cc.

In a particular embodiment, the first cathode active material of Formula 1 may be a layered crystalline structure lithium transition metal oxide satisfying conditions that the oxide includes mixed transition metals of Ni and Mn, an average oxidation number of the total transition metals excluding lithium exceeds +3, and the amount of Ni is the same or greater than that of Mn on a molar ratio basis.

In addition, in another particular embodiment, the lithium transition metal oxide of Formula 1 may be $Li(Ni_{0.5}Mn_{0.3}Co_{0.2})O_2$ or $Li(Ni_{1/3}Mn_{1/3}Co_{1/3})O_2$.

In Formula 1, the transition metal such as Ni, Mn, or Co may be substituted with a metal and/or other transition metal (M) elements having an oxidation number of +2 to +4. In particular, the transition metal may be substituted with at least one selected from the group consisting of Al, Mg, and Ti. In this case, a substitution amount may satisfy the condition: $0.3 \leq z \leq 0.6$.

In addition, in a specific embodiment of the present invention, the second cathode active material may be a spinel crystalline structure lithium transition metal oxide having an average particle diameter (with respect to capacity) of 0.1 to 0.2 µm/mAh and a powder conductivity of $1 \times 10^{-5}$ S/cm or greater to less than $10 \times 10^{-5}$ S/cm at a powder density of 2.65 to 2.85 g/cc.

In Formula 2, M' may be at least one selected from the group consisting of Co, Mn, Ni, Al, Mg, and Ti.

In addition, in Formulas 1 and 2, the oxygen ion may be substituted with a monovalent or divalent anion (A, A') within a predetermined range, wherein A and A' may be each independently at least one selected from the group consisting of halogens such as F, Cl, Br, and I, S, and N.

Substitution of these anions enables high binding ability with the transition metals and structural transition of the compound is prevented, whereby the lithium secondary battery may have improved lifespan. On the other hand, when the substitution amounts of A and A' are too high (t>2), the lifespan of the lithium secondary battery may rather be deteriorated due to incomplete crystal structure.

In the cathode active material of Formula 1 or 2, when 0 is substituted with a halogen or the transition metal such as Ni, Mn, or the like is substituted with another transition metal (M, M'), the corresponding compound may be added prior to high-temperature reaction.

According to experimental results confirmed by the inventors of the present invention, the lithium secondary battery that includes the cathode and anode active materials having the aforementioned particular physical quantities exhibits high output characteristics. The physical quantities may be measured using measurement methods known in the art. In particular, the specific surface area may be measured by BET, the powder density may be measured using a true density measurement method, and the powder conductivity may be measured by measuring sheet resistance after forming a powder into a pellet.

The high-output lithium secondary battery including the cathode and anode active materials having the aforementioned particular physical quantities has a capacity with respect to volume of 0.03 to 0.05 Ah/cm$^3$ and an energy with respect to volume of 0.1 to 0.2 Wh/cm$^3$.

The separator is disposed between the cathode and the anode and, as the separator, a thin insulating film with high ion permeability and high mechanical strength is used. The separator generally has a pore diameter of 0.01 to 10 µm and a thickness of 5 to 300 µm.

As the separator, sheets or non-woven fabrics, made of an olefin polymer such as polypropylene; or glass fibers or polyethylene, which have chemical resistance and hydrophobicity, or kraft papers are used. Examples of commercially available separators include Celgard series such as Celgard® 2400 and 2300 (available from Hoechest Celanese Corp.), polypropylene separators (available from Ube Industries Ltd., or Pall RAI Co.) and polyethylene series (available from Tonen or Entek).

In a specific embodiment of the present invention, the separator may be an organic-inorganic composite separator including a polyolefin-based separator and an inorganic material such as silicon. Prior patent applications of the present applicant disclose the fact that the organic-inorganic composite separator enables improved safety or the like of lithium secondary batteries.

The present invention also provides a medium and large-scale battery module including the above-described high-output lithium secondary battery as a unit battery and a medium and large-scale battery pack including the battery module.

The battery pack may be applied to power sources for electric vehicles, hybrid electric vehicles, and the like, which require high-output and may also be applied to power storage devices in which it is important to secure stability and reliability according to high output.

In addition, the present invention provides a device using the battery pack as a power source. In particular, the battery pack may be used as a power source of electric vehicles, hybrid electric vehicles, plug-in hybrid vehicles, or power storage devices.

The configuration of the medium and large-scale battery module and battery pack and fabrication thereof are known in the art, and thus, a detailed description thereof will be omitted here.

The cathode may be manufactured by coating, on a cathode current collector, a slurry prepared by mixing a cathode mixture including the cathode active material with a solvent such as NMP or the like and drying and rolling the coated cathode current collector.

The cathode mixture may optionally include a conductive material, a binder, a filler, or the like, in addition to the cathode active material.

The cathode current collector is generally fabricated to a thickness of 3 to 500 μm. The cathode current collector is not particularly limited so long as it does not cause chemical changes in the fabricated lithium secondary battery and has high conductivity. For example, the cathode current collector may be made of copper, stainless steel, aluminum, nickel, titanium, sintered carbon, copper or stainless steel surface-treated with carbon, nickel, titanium, silver, or the like, an aluminum-cadmium alloy, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is typically added in an amount of 1 to 30 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between the active material and the conductive material and in binding of the active material to the cathode current collector. The binder is typically added in an amount of 1 to 30 wt % based on the total weight of the mixture including the cathode active material. Examples of the binder include, but are not limited to, polyvinylidene fluoride, polyvinyl alcohols, carboxymethyl-cellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

As a dispersion solution, isopropyl alcohol, N-methylpyrrolidone (NMP), acetone, or the like may be used.

Uniform coating of an electrode material paste on a metallic material may be performed using a method selected from among known methods or a new appropriate method in consideration of properties of the electrode material. For example, the coating process may be performed by applying the paste to the cathode current collector and uniformly dispersing the paste thereon using a doctor blade. In some embodiments, the application and dispersion processes may be implemented as a single process. The coating process may be performed by, for example, die-casting, comma coating, screen-printing, or the like. In another embodiment, the paste may be molded on a separate substrate and then adhered to a current collector via pressing or lamination.

The drying of the coated paste on a metallic plate may be performed in a vacuum oven at a temperature between 50 and 200° C. for a period of one day.

The anode may be manufactured by coating the anode active material on an anode current collector and drying the coated anode current collector. As desired, components such as the above-described conductive material, binder and filler may further be optionally added to the anode active material.

The anode current collector is typically fabricated to a thickness of 3 to 500 μm. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, aluminum-cadmium alloys, or the like. As in the cathode current collector, the anode current collector may also have fine irregularities at a surface thereof to enhance adhesion between the anode current collector and the anode active material. In addition, the anode current collector may be used in various forms including films, sheets, foils, nets, porous structures, foams, and non-woven fabrics.

A lithium salt-containing non-aqueous electrolyte is composed of a non-aqueous electrolyte and a lithium salt. As the non-aqueous electrolyte, a non-aqueous electrolytic solution, an organic solid electrolyte, or an inorganic solid electrolyte may be used.

For example, the non-aqueous electrolytic solution may be an aprotic organic solvent such as N-methyl-2-pyrrolidinone, propylene carbonate, ethylene carbonate, butylene carbonate, dimethyl carbonate, diethyl carbonate, ethyl methyl carbonate, gamma butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a graph showing X-ray diffraction (XRD) analysis results of surface-modified first graphite according to the present invention ((a): XRD analysis results of the first graphite prior to surface modification and (b): XRD analysis results of the first graphite after surface modification.

MODE FOR INVENTION

Now, the present invention will be described in more detail with reference to the following examples. These examples are provided only for illustration of the present invention and should not be construed as limiting the scope and spirit of the present invention.

EXAMPLE 1

A cathode active material prepared by mixing $LiNi_{1/3}Co_{1/3}Mn_{1/3}O_2$ having an average particle diameter (with respect to capacity) of 0.05 μm/mAh and $LiMn_2O_4$ having an average particle diameter (with respect to capacity) of 0.14 μm/mAh in a mixing ratio of 30:70, a conductive material, and a binder were prepared in a weight ratio of 89:6.0:5.0 and then were added to NMP and mixed therein to prepare a cathode mixture. Subsequently, the cathode mixture was coated on an Al foil having a thickness of 20 μm and rolled and dried, thereby completing fabrication of a cathode.

Similarly, an anode active material prepared by mixing carbon having a specific surface area (with respect to capacity) of 0.020 $m^2$/mAh and graphite having a specific surface area (with respect to capacity) of 0.009 $m^2$/mAh in a mixing ratio of 70:30, a conductive material, and a binder were prepared in a weight ratio of 92:2:6, added to a mixer, and mixed therein to prepare an anode mixture. Subsequently, the anode mixture was coated on a Cu foil having a thickness of 10 μm and rolled and dried, thereby completing fabrication of an anode.

The cathode, the anode, and a carbonate electrolytic solution containing 1M $LiPF_6$ as an electrolyte were used to manufacture a battery.

In this regard, $LiNi_{1/3}Co_{1/3}Mn_{1/3}O_2$ had a powder conductivity of $1.0 \times 10^{-3}$ S/cm at a powder density of 2.75 g/cc, $LiMn_2O_4$ had a powder conductivity of $5 \times 10^{-5}$ S/cm at a powder density of 2.80 g/cc, the carbon had a powder conductivity of 30 S/cm at a powder density of 1.1 g/cc, and the graphite had a powder conductivity of 250 S/cm at a powder density of 1.5 g/cc.

EXAMPLE 2

A battery was manufactured in the same manner as in Example 1, except that the mixing ratio of $LiNi_{1/3}Co_{1/3}Mn_{1/3}O_2$ to $LiMn_2O_4$ in the cathode active material was 20:80.

EXAMPLE 3

A battery was manufactured in the same manner as in Example 1, except that the mixing ratio of carbon to graphite in the anode active material was 80:20.

EXAMPLE 4

A battery was manufactured in the same manner as in Example 1, except that carbon having a specific surface area (with respect to capacity) of 0.012 $m^2$/mAh was used instead of the carbon having a specific surface area (with respect to capacity) of 0.020 $m^2$/mAh. In this regard, the carbon used had a powder conductivity of 65 S/cm at a powder density of 1.5 g/cc.

EXAMPLE 5

A battery was manufactured in the same manner as in Example 4, except that the mixing ratio of $LiNi_{1/3}Co_{1/3}Mn_{1/3}O_2$ to $LiMn_2O_4$ in the cathode active material was 20:80.

EXAMPLE 6

A battery was manufactured in the same manner as in Example 4, except that the mixing ratio of carbon to graphite in the anode active material was 80:20.

COMPARATIVE EXAMPLE 1

A battery was manufactured in the same manner as in Example 1, except that the mixing ratio of $LiNi_{1/3}Co_{1/3}Mn_{1/3}O_2$ to $LiMn_2O_4$ was 70:30.

COMPARATIVE EXAMPLE 2

A battery was manufactured in the same manner as in Example 1, except that the mixing ratio of carbon to graphite was 30:70.

COMPARATIVE EXAMPLE 3

A battery was manufactured in the same manner as in Example 1, except that a mixture of $LiNi_{1/3}CO_{1/3}Mn_{1/33}O_2$ having an average particle diameter (with respect to capacity) of 0.12 μm/mAh and $LiMn_2O_4$ having an average particle diameter (with respect to capacity) of 0.23 μm/mAh was used as the cathode active material.

COMPARATIVE EXAMPLE 4

A battery was manufactured in the same manner as in Example 1, except that a mixture of $LiNi_{1/3}Co_{1/3}Mn_{1/3}O_2$ having a powder conductivity of $9 \times 10^{-4}$ S/cm at a powder density of 2.75 g/cc and $LiMn_2O_4$ having a powder conductivity of $5 \times 10^{-6}$ S/cm at a powder density of 2.80 g/cc was used as the cathode active material.

COMPARATIVE EXAMPLE 5

A battery was manufactured in the same manner as in Example 1, except that a mixture of carbon having a specific surface area (with respect to capacity) of 0.007 $m^2$/mAh and graphite having a specific surface area (with respect to capacity) of 0.004 $m^2$/mAh was used as the anode active material.

COMPARATIVE EXAMPLE 6

A battery was manufactured in the same manner as in Example 1, except that a mixture of carbon having a powder conductivity of 10 S/cm at a powder density of 1.1 g/cc and graphite having a powder conductivity of 50 S/cm at a powder density of 1.5 g/cc was used as the anode active material.

EXPERIMENTAL EXAMPLE 1

Rate characteristics of the batteries manufactured according to Examples 1 to 6 and Comparative Examples 1 to 6 were evaluated at a rate of 3 C vs. 0.2 C and evaluation results are shown in Table 1 below. C-rates of the batteries were measured at 1C(13A). Charging and discharging were performed between 3.0 and 4.2 V, and charging was measured at a constant current and a constant voltage (CC/CV) and discharging was measured at CC.

TABLE 1

|  | 3 C/0.2 C (%) |
|---|---|
| Example 1 | 95.6 |
| Example 2 | 96.9 |
| Example 3 | 97.1 |
| Example 4 | 94.5 |
| Example 5 | 93.4 |
| Example 6 | 95.1 |
| Comparative Example 1 | 88.1 |
| Comparative Example 2 | 91.7 |
| Comparative Example 3 | 88.4 |
| Comparative Example 4 | 89.1 |
| Comparative Example 5 | 87.5 |
| Comparative Example 6 | 89.5 |

EXPERIMENTAL EXAMPLE 2

After flowing current for 10 seconds, output values of the batteries of Examples 1 to 6 and Comparative Examples 1 to 6 were calculated using the following equations and output characteristics thereof were evaluated through comparison therebetween. Results are shown in Table 2 below.

10 s discharge battery resistance at SOC50%

$$R = (OCV - V)/I$$

In the above equation, OCV refers to an open circuit voltage immediately before discharge pulse and V is a cut-off voltage of a 10 s discharge pulse.

10 s discharge power at the different SOC %

$$P = V\min(OCV - V\min)/R$$

TABLE 2

| 10 s output | Vs. Example 1 (%) |
|---|---|
| Example 1 | 100 |
| Example 2 | 105.3 |
| Example 3 | 103.5 |
| Example 4 | 104.1 |
| Example 5 | 100.1 |
| Example 6 | 103.4 |
| Comparative Example 1 | 92.5 |
| Comparative Example 2 | 89.3 |
| Comparative Example 3 | 94.4 |

TABLE 2-continued

| 10 s output | Vs. Example 1 (%) |
|---|---|
| Comparative Example 4 | 93.7 |
| Comparative Example 5 | 92.7 |
| Comparative Example 6 | 91.8 |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Industrial Applicability

As described above, a lithium secondary battery according to the present invention uses, as an anode active material, a mixture of amorphous carbon having a higher energy density (300 mAh/g or greater) than conventional amorphous carbon and having a specific physical quantity and crystalline graphite that is used in a decreased loading amount and thus provides enhanced output characteristics in a predetermined mixing ratio and uses, as a cathode active material well balanced with the anode active material, a mixture of a layered-structure lithium transition metal oxide and a spinel-structure lithium manganese oxide in a predetermined ratio, whereby the lithium secondary battery has the same energy density as that of conventional lithium secondary batteries and achieves output characteristics well suited to electric vehicles and hybrid electric vehicles.

The invention claimed is:

1. A high-output lithium secondary battery comprising: a cathode comprising, as cathode active materials, a first cathode active material represented by Formula 1 below and having a layered structure, and having an average particle diameter with respect to capacity of 0.03 to 0.1 μm/mAh, and having a powder conductivity of $1 \times 10^{-3}$ S/cm or greater to less than $10 \times 10^{-3}$ S/cm at a powder density of 2.65 to 2.85 g/cc:

$$Li_x(Ni_vMn_wCo_yM_z)O_{2-t}A_t \quad (1)$$

wherein $0.8 < x \leq 1.3$, $0 \leq v \leq 0.9$, $0 \leq w \leq 0.9$, $0 \leq y \leq 0.9$, $0 \leq z \leq 0.9$, $x+v+w+y+z=2$, and $0 \leq t < 0.2$;

M refers to at least one metal or transition metal cation having an oxidation number of +2 to +4; and A is a monovalent or divalent anion, and a second cathode active material represented by Formula 2 below and having a spinel structure, and having an average particle diameter with respect to capacity of 0.1 to 0.2 μm/mAh, and having a powder conductivity of $1 \times 10^{-5}$ S/cm or greater to less than $10 \times 10^{-5}$ S/cm at a powder density of 2.65 to 2.85 g/cc:

$$Li_aMn_{2-b}M'_bO_{4-c}A'_c \quad (2)$$

wherein $0.8 < a \leq 1.3$, $0 \leq b \leq 0.5$, and $0 \leq c \leq 0.3$;

M' refers to at least one metal or transition metal cation having an oxidation number of +2 to +4; and A' is a monovalent or divalent anion, wherein an amount of the second cathode active material is greater than 40 wt % and less than 100 wt % based on a total weight of the first and second cathode active materials;

an anode comprising crystalline graphite and amorphous carbon as anode active materials, wherein an amount of the amorphous carbon is greater than 40 wt % and less than 100 wt % based on a total weight of the anode active materials, wherein the amorphous carbon is one selected from the group consisting of a first carbon having a specific surface area with respect to capacity of 0.01 to 0.031 m$^2$/mAh, a second carbon having a specific surface area with respect to capacity of 0.0035 to 0.0170 m$^2$/mAh, and a mixture thereof; and a separator.

2. The high-output lithium secondary battery according to claim 1, wherein the crystalline graphite is one selected from the group consisting of a first graphite having a specific surface area with respect to capacity of 0.007 to 0.011 m$^2$/mAh, a second graphite having a specific surface area with respect to capacity of 0.005 to 0.013 m$^2$/mAh, and a mixture thereof.

3. The high-output lithium secondary battery according to claim 2, wherein the first graphite has a powder conductivity of 100 S/cm or greater to less than 1000 S/cm at a powder density of 1.4 to 1.6 g/cc.

4. The high-output lithium secondary battery according to claim 3, wherein the first graphite has 3R and 2H peaks distinguishable as a rhombohedral peak of a (101) plane at 2θ=43° based on XRD data.

5. The high-output lithium secondary battery according to claim 2, wherein the second graphite has a powder conductivity of 10 S/cm or greater to less than 200 S/cm at a powder density of 1.4 to 1.6 g/cc.

6. The high-output lithium secondary battery according to claim 5, wherein the second graphite has a 2H peak as a rhombohedral peak of a (101) plane at 2θ=43° based on XRD data.

7. The high-output lithium secondary battery according to claim 1, wherein the first carbon has a powder conductivity of 15 S/cm or greater to less than 100 S/cm at a powder density of 1.0 to 1.2 g/cc.

8. The high-output lithium secondary battery according to claim 1, wherein the second carbon has a powder conductivity of 30 S/cm or greater to less than 100 S/cm at a powder density of 1.4 to 1.6 g/cc.

9. The high-output lithium secondary battery according to claim 1, wherein, in Formula 1, M is at least one selected from the group consisting of Al, Mg, and Ti and, in Formula 2, M' is at least one selected from the group consisting of Co, Mn, Ni, Al, Mg, and Ti.

10. The high-output lithium secondary battery according to claim 1, wherein, in Formulas 1 and 2, A and A' are each independently at least one selected from the group consisting of halogens, S and N.

11. The high-output lithium secondary battery according to claim 1, wherein the lithium secondary battery has a capacity with respect to volume of 0.03 to 0.05 Ah/cm$^3$ and an energy with respect to volume of 0.1 to 0.2 Wh/cm$^3$.

12. The high-output lithium secondary battery according to claim 1, wherein the separator is an organic-inorganic composite separator.

13. A battery module comprising the lithium secondary battery according to claim 1.

14. An electric vehicle or hybrid electric vehicle comprising the battery module according to claim 13.

15. A power storage device comprising the battery module according to claim 13.

16. The lithium secondary battery of claim 1, wherein the amount of the amorphous carbon is more than that of the crystalline graphite.

\* \* \* \* \*